(No Model.)
A. G. ROCKFELLOW.
BALL AND SOCKET HINGE.
No. 327,319. Patented Sept. 29, 1885.
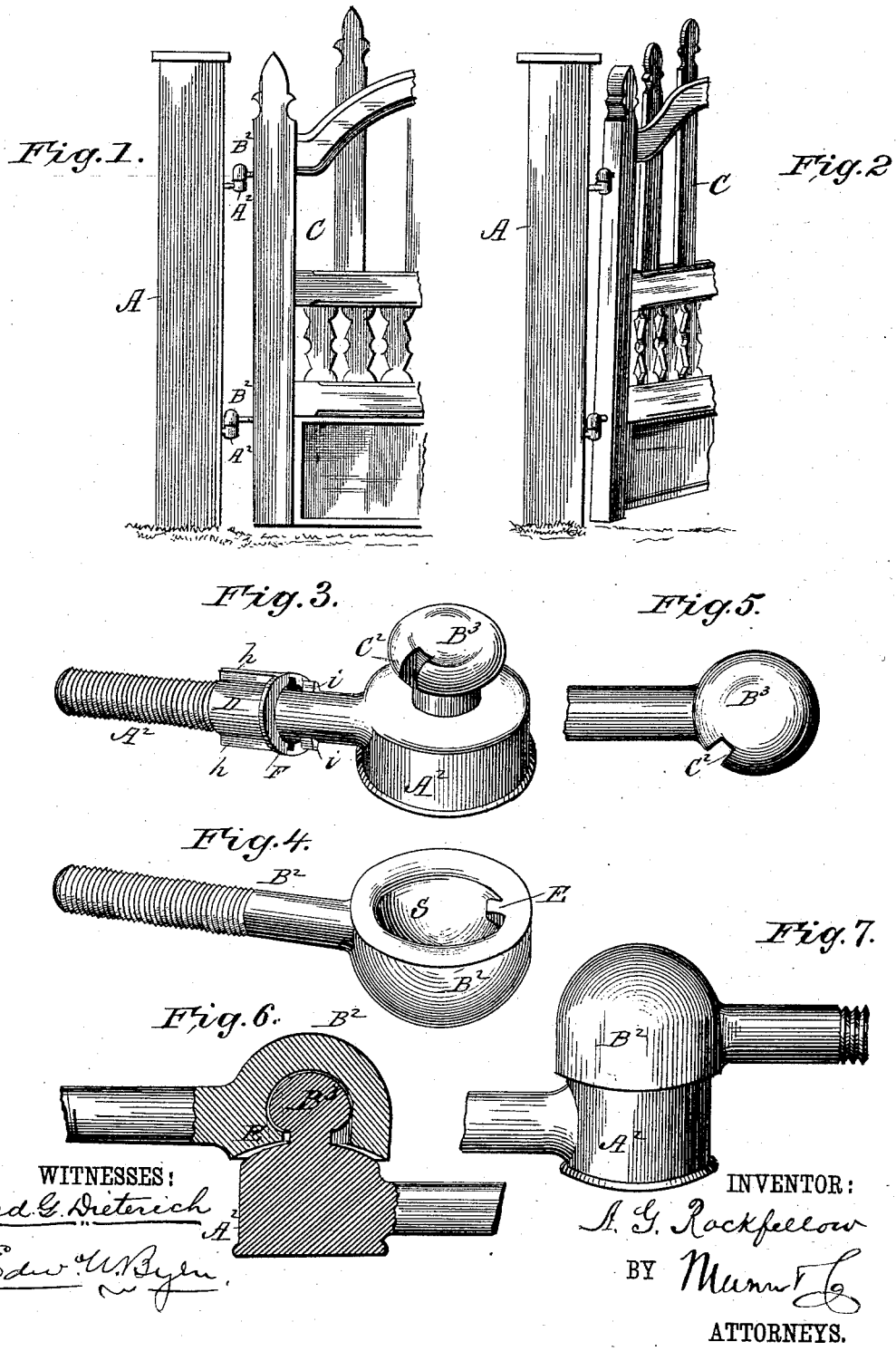
WITNESSES:
Fred G. Dieterich
Edw. W. Byrn
INVENTOR:
A. G. Rockfellow
BY Munn & Co
ATTORNEYS.

United States Patent Office.

ALBERT G. ROCKFELLOW, OF ASHLAND, OREGON.

BALL-AND-SOCKET HINGE.

SPECIFICATION forming part of Letters Patent No. 327,319, dated September 29, 1885.

Application filed June 23, 1885. (No model.)

*To all whom it may concern:*

Be it known that I, ALBERT G. ROCKFELLOW, a citizen of the United States, residing at Ashland, in the county of Jackson and State of Oregon, have invented a new and useful Improvement in Ball-and-Socket Lock-Hinges, of which the following is a description.

Figure 1 is a front elevation of a gate embodying my improvements. Fig. 2 shows the gate at an angle of about thirty-five degrees from the shut or normal position. Fig. 3 is a perspective view of the supporting part of the hinge; Fig. 4, a similar view of the supported part; Fig. 5, a top view of the ball $B^3$; and Figs. 6 and 7 are respectively a section and side elevation of the hinge.

My invention relates to that kind of hinge commonly called the "hook-and-eye" hinge, and it has three prime objects—to wit, to be self closing, locking, and adjustable. As best calculated to secure these several objects, a ball-and-socket joint and screw shank have been chosen.

It consists in the peculiar construction and combination of parts which I will now proceed to describe.

A represents the post on which the gate C is hung. The gate may be either a picket, panel, or other form of gate. The gate C is hinged to the post A by the hinges $A^2 A^2$ and $B^2 B^2$, Figs. 3 and 4.

$A^2 A^2$, Fig. 3, represent the supporting part of the hinge, as seen in place in the gate C, Figs. 1 and 2, and $B^2 B^2$, Fig. 4, the supported part. $B^3$, Fig. 3, is the ball, and S, Fig. 4, the socket. $C^2$, Fig. 3, is a groove for the passage of the lug or lip E, Fig. 4, by which the hinge is locked when the parts are connected. D, Fig. 3, is a sleeve with flanges F and $h\,h$, the flanges $h$ being grooved interiorly and fitting over flanges $i\,i$ on the shank $A^2$.

Referring to the drawings it will be seen that the hinges $A^2 A^2$ and $B^2 B^2$, Figs. 1 and 2, are so adjusted as to be out of a vertical line, and that in Fig. 2 the open gate hangs at an inclination of about one degree out of a vertical line, the inclination being the result of the peculiar adjustment of the hinges. This inclination of the open gate causes it to close itself when set at liberty by the force of its own gravity. It must be observed that to admit of such an inclination of the gate a closed or a single-jointed hinge must have a rocking or tilting or an oscillating as well as a rotary motion. This peculiar motion is secured by the ball-and-socket joint, and by this joint is imparted to the gate in its movements. Thus, by the adjustment of the hinges and by the ball-and-socket joint I secure the property of self-closing and adjustability for my gate. By the use of the groove $C^2$ in the ball $B^3$, Fig. 3, and the lip E in the socket S, Fig. 4, I am enabled to make a fast joint (or lock-joint) for my hinge. The groove and lip are so situated that when the gate, in being hung, is brought to about twenty-two and one-half degrees of the closed position the lip will engage with the groove and the parts become connected, and as the gate turns to its closed position the lip passes under the full round face of the ball, so that the gate cannot be unhinged when closed.

As regards the efficiency of this lock, the position of the groove and lip are of no importance; but as regards convenience of operation they are important.

The object of the sleeve D, Fig. 3, is to keep the shank $A^2$ from turning in the post A when the weight of the open gate would have a tendency so to turn it. In boring for the hinge $A^2$ a hole the size of the diameter of the sleeve is first bored the depth of the length of the sleeve, and then the hole for the shank is bored. When turning the shank A into the post, the sleeve is held back until the hinge is properly adjusted, when the former is driven into its place. The sleeve is kept from turning in the post by its flanges $h\,h$ burying themselves in the wood, and the shank of the hinge is kept from turning by its flanges $i\,i$ entering the hollow flanges $h\,h$. The flange F adapts the sleeve to be drawn out when it is desired to do so.

In defining my invention with greater clearness with reference to the ball-and-socket feature I would state that I am aware that a ball-and-socket hinge is not new in itself, and that lock hinges have heretofore been constructed, as shown in the patent to Norton, June 4, 1872; but I do not know that a ball-and-socket hinge has been arranged to lock the parts together as herein shown, which secures the new result of protecting the joint of the hinge completely from the weather, and protecting it from the lodgment of grit and dirt, thus preventing wear and rust and prolonging the life of the hinge, and at the same time securing to the gate the inclination that makes it self-closing.

Having thus described my invention, what I claim as new, and wish to secure by Letters Patent, is—

1. In a screw-shank hinge, the combination, with the screw-shank and its flanges $i\ i$, of the sleeve D with its flanges F and $h\ h$, substantially as and for the purpose set forth.

2. In a screw-shank hinge with ball-and-socket joint, the combination, with the screw-shank and its flanges $i\ i$ and the sleeve D with its flanges F and $h\ h$, of the ball $B^3$ with its groove $C^2$ and the socket S with its lip E, substantially as and for the purpose set forth.

3. A ball-and-socket hinge consisting of a supporting part having a ball with an overhanging edge and notch $C^2$ and a supported section having a socket with a projecting lip, E, adapted to pass through the notch $C^2$ and pass beneath the overhanging edge of the ball to form a protected ball-and-socket lock-hinge, as described.

ALBERT G. ROCKFELLOW.

Witnesses:
HARRY T. BRAGDON,
G. F. BILLINGS.